Jan. 20, 1948.                J. S. GLASING ET AL                    2,434,795
                        METHOD AND MACHINE FOR LAMINATING
                            Filed July 1, 1944              2 Sheets-Sheet 1
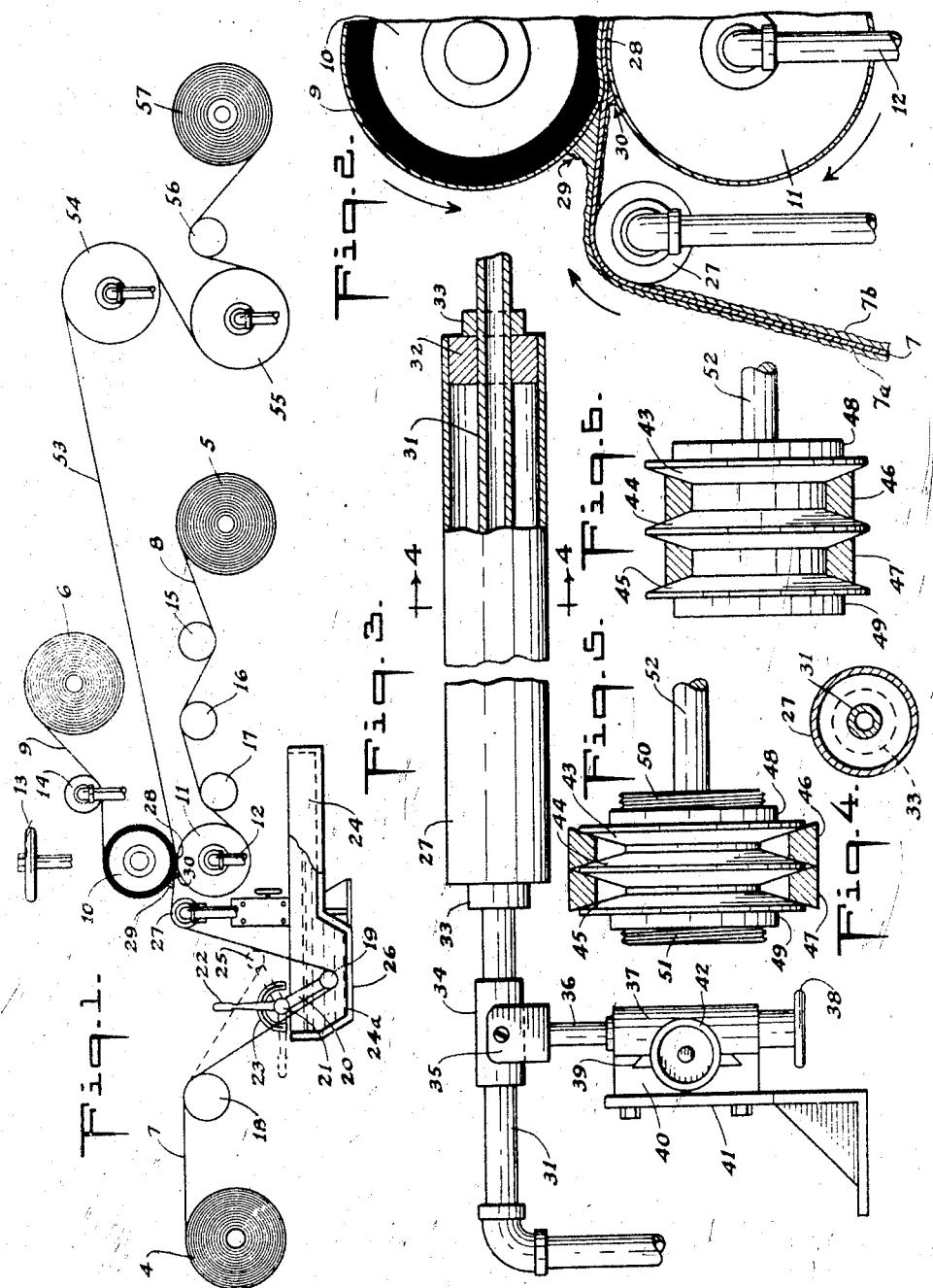
INVENTORS.
JOSEPH S. GLASING
AND
HAROLD D. MARCOTTE
BY
ATTORNEYS.

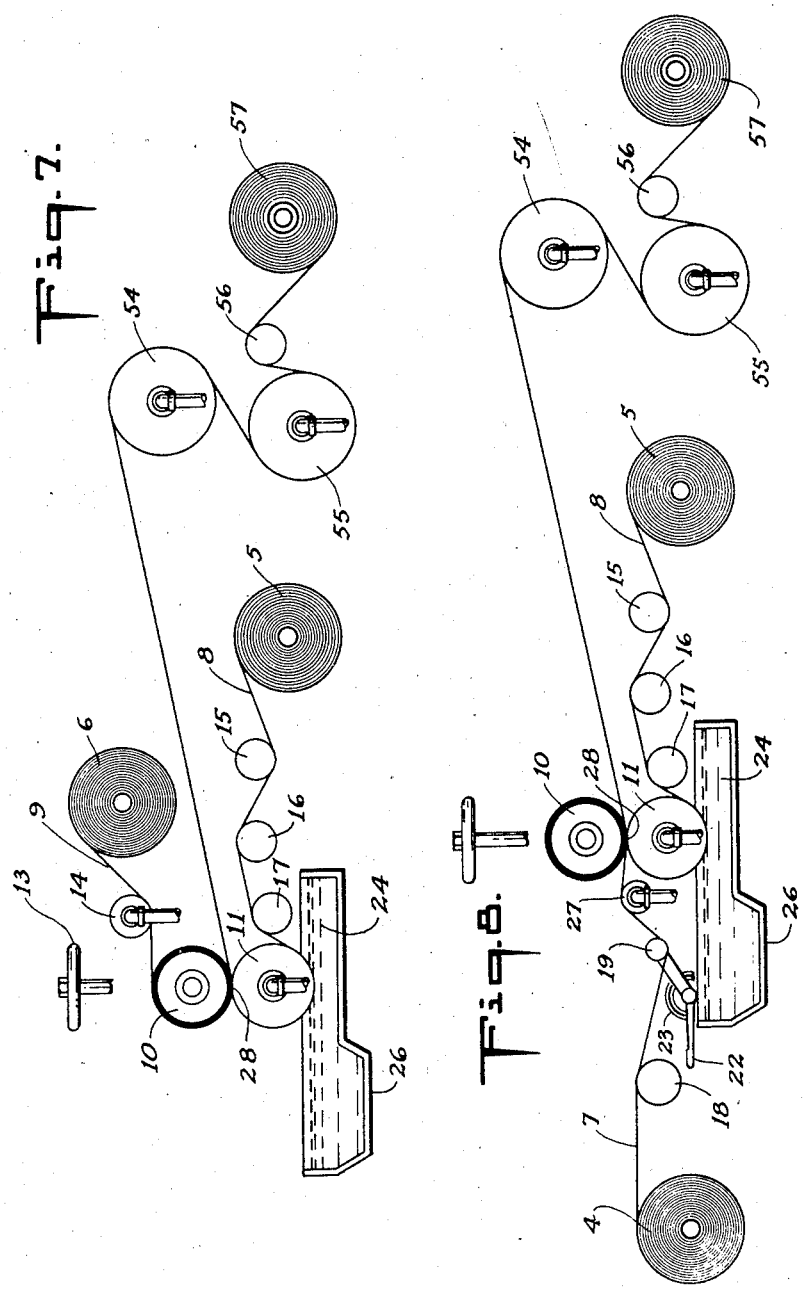

Patented Jan. 20, 1948

2,434,795

UNITED STATES PATENT OFFICE 2,434,795

METHOD AND MACHINE FOR LAMINATING

Joseph S. Glasing, Huntington, and Harold D. Marcotte, Russell, Mass., assignors to Westfield River Paper Company, Inc., Russell, Mass., a corporation of Massachusetts Application July 1, 1944, Serial No. 543,160

8 Claims. (Cl. 154—37)

This invention relates to a method and machine for laminating multiple sheets of film like material, and is particularly concerned with providing uniformity of adhesion between a multiplicity of sheets which are joined simultaneously.

Most of the efforts for laminating sheets of film like material such as glassine paper, Cellophane, or the like, heretofore indulged in, have been restricted to the production of a two-ply construction or at least to the laminating of only two sheets at one time. This has largely been due to manufacturing limitations, since no way was known for increasing the number of laminations, simultaneously effected, without introducing undesirable characteristics into the product. With the increasing use of these laminated films, however, it has become more and more apparent that a two-ply construction is not entirely adequate for some purposes. In particular, but merely as an illustration, we refer to the packaging of hygroscopic foods. Many of these demand a greater moisture protection than is normally provided by a two-ply sheet.

Practices followed in the past for increasing the number of laminations beyond two have been expensive, and the resultant products have not been too satisfactory. One of the common ones was to employ a series of coating heads or stations. At the first head, two sheets would be secured together. They would then travel to the next coating head where a third sheet would be applied to the first two, and the process would be continued if a greater number of plies was desired. This method was quite complex and the securing of the various plies would not be uniform, as evidenced by the fact that the sheet would tend to curl, and the plies would come apart.

Another practice previously followed, and probably the most common one, has been to laminate two sheets together in a conventional two-ply machine. The two-ply roll would then be returned to the front of the machine and the operation repeated, securing a third ply to the first two, and so on, if a greater number of plies was desired. This process is very time consuming, necessitates adjustment of the tensions of the rolls between the applications, and often results in the application of uneven tensions, with the consequent production of inferior sheets.

Hardly any of the few instances where attempts have been made to laminate more than two plies simultaneously were concerned with the niceties that must be taken in to consideration when light weight film like material is being dealt with, and where the appearance of the finished product is an important factor. Such attempts as have been made to incorporate such niceties required the use of involved and costly machines in which the various sheets to be laminated arrived at the combining stage after different lengths of travel from the coating and heating stages, hence at different temperatures, coated with adhesive at different temperatures or different thicknesses, and under different tensions. Obviously the sheets and securing of the same were not uniform so that the resultant laminated product could not be uniform, let alone be of the excellence required.

The instant invention eliminates the past difficulties and deficiencies by providing for the lamination of three sheets all at once, with the desired uniformity of all factors. Not only does it teach the way to control the tension and temperature of the plies, and the temperature and quantity of the adhesive applied between the various plies, but it also teaches how this can be done right up to the securing station so that uniformity of securing is assured.

The apparatus required to carry out the method is simple and inexpensive, both in construction and operation, yet insures relatively foolproof operation and the production of a laminated sheet of uniform excellence.

It is accordingly a principal object of this invention to provide a simple and effective method and apparatus for effectively laminating a multiplicity of sheets of film like material.

Another important object of the invention is to provide a method and apparatus for producing improved multiple laminated sheets in a single operation.

Further objects of the invention concern the laminating of three sheets of film like material in an economical but exact fashion, with simplicity of control, with a saving of adhesive, and with the resulting product having superior transparency, adherence of the plies and handling qualities. Finally our invention accomplishes the object long sought by the trade, of producing a laminated glassine paper which does not curl up at the edges.

Though in the following description we refer to the film like material to be laminated, as glassine paper, we wish it to be expressly understood that such reference is solely for the purpose of illustration. The method and apparatus of the invention are also applicable for the laminating of a variety of film like materials. Among such are Cellophane, parchment paper, metallic foils and other materials not adversely affected by the conditions imposed by our method. Also films of dissimilar materials may be laminated.

For illustration of what we consider the preferred form of method and apparatus for the practice of our invention, we refer to the accompanying drawing in which—

Figure 1 is a diagrammatic elevation, with certain portions in section, of the essential elements of the machine of the invention showing the use of the same in the performance of our novel method;

Figure 2 is an enlarged elevation of that portion of the machine where the actual laminating of the plies takes place;

Figure 3 is an enlarged elevation, partly in section, of the adjustable regulating roller of the machine and the mounting therefor;

Figure 4 is a vertical section thereof, taken on the lines 4—4 of Figure 3;

Figures 5 and 6 are elevations of adjustable speed V belt drive pulleys employed in the machine of the invention;

Figures 7 and 8 are diagrammatic elevations showing conversions of our machine to two ply lamination.

Referring to the complete machine, as shown in Fig. 1 of the drawing, rolls of glassine paper, or other film like material to be laminated, are shown at 4, 5 and 6, and the sheets coming from them are shown respectively at 7, 8, and 9. Pressure rollers, between which the three plies of sheet pass in order to be secured together, are indicated at 10 and 11. These are arranged vertically, one above the other. The lower chilled iron roll 11 is carried in a fixed mounting and is driven by suitable means. This roll turns on a hollow axle to permit heating with steam or hot oil, one of the pipes for which is shown at 12 in Figure 1. Roll 10 is a rubber coated roll which is mounted for vertical adjustment so that the tension it exerts upon the plies being laminated can be controlled. This adjustment is accomplished by some common means the control element of which, in the nature of a hand wheel, is shown at 13. Preferably the ends of the roller are adjusted independently by some common means such as shown in Letters Patent of the United States No. 428,147 to Seaver, and No. 2,163,712 to Shearer. In addition, the rubber roll 10 is coupled with an adjustable independent drive to enable its speed to be varied from somewhat faster to somewhat slower than the speed of the roller 11, as the operator may select. We have obtained better results by running roll 10 a little slower than roll 11 though under certain conditions the reverse might be desirable, or it might be preferred to synchronize the speeds of the surfaces of the rolls 10 and 11 where they press the sheets together. The means by which the speed of roll 10 can be varied is shown in Figs. 5 and 6 to be described hereinafter.

The sheet 9 from the roll 6 is passed under the fly roll 14 and passes part way round the rubber roll 10 to join with the other sheets. Since, in this form, the rubber roll 10 is not heated, it is desirable, in order to have the sheet 9 at the same temperature as the other sheets when they come together, to heat fly roll 14. The same may be done in a manner to be described hereinafter. The sheet 8 from the roll 5 passes under fly roll 15 and over fly rolls 16 and 17, before passing underneath and part way round the heated iron roll 11 to where it joins with the other sheets.

The sheet 7 from the roll 4 performs the important function of carrying the adhesive for the lamination of the sheets 8 and 9 to it. In leaving the roll 7, it passes over the fly roll 18 and under dip roll 19. This dip roll is mounted on a lever 20, pivoted at 21, which has a control handle 22 and operates about a sector 23. This lever device facilitates threading of the sheet 7 under the dip roll 19 by enabling the lifting of the roll 19 out of the adhesive pan 24. The lifted position of the dip roll is shown in dotted lines at 25.

Once the sheet 7 is threaded about the dip roll 19, and inserted at 28 as in the dotted line showing in Fig. 1, the latter is lowered into the pan 24 so that the sheet is completely submerged in the adhesive contained therein. Accordingly, as the sheet 7 emerges from the pan 24 it is completely covered on both sides with adhesive. To make sure of this, and that the sheet is warmed by the adhesive, the forward part of the pan 24a is made deeper than the rest of it.

The adhesive employed when the sheets are glassine paper is a thermoplastic cement, which must be kept at a suitable temperature. This is accomplished by heat jacketing the pan 24 by some means such as double walled construction shown at 26. The temperature of the pan, of course, is controlled in accordance with the particular adhesive employed. Since the pan extends under the roller 11, the heat therefrom assists in heating the sheet 8.

On leaving the pan 24 the sheet 7 passes up over roll 27. The presence, structure and position of this roll are important features of the invention as they materially enhance the proper laminating of the sheets.

In other words, the presence of the roller 27, close to the nip 28, between pressure rollers 10 and 11, goes a long way towards making the operation successful. In the first place, it controls the direction by which sheet 7 enters the nip 28, to prevent any substantial contact between the sheet 7 and either of the sheets 8 and 9 before contact with both of them is established. Secondly, it assures the formation of ample puddles of adhesive 29 and 30 and exerts a control over the amount of adhesive that may collect in such puddles. Moreover, being a heated roll, 27 maintains the adhesive and heats the sheet 7 to a temperature as close to that of the sheets 8 and 9 as possible, so that, as all the joined elements cool, they will do so evenly.

Though a smooth surface roll at the position of 27 may enable proper operation even though stationary, it is preferable to mount it so it can rotate. Being quite a small roller, yet one that must be heated where thermoplastic cements are used, the mounting of it for rotation while at the same time heating it with steam or hot oil presents a problem. We have solved that problem satisfactorily by means of the construction shown in detail in Figs. 3 and 4. There the shaft for the roller and the heating pipe are shown at 31 as one and the same element. The pipe 31 may be connected with the supply of heating medium by some common means such as a section of flexible conduit or high pressure hose, as is well known in the art. The actual roller 27 is a thin walled member, mounted concentrically with respect to the shaft 31 by means of bearing members 32. These bearing members also serve to close the ends of the cylinder formed by the roll 27 and retain therein the heat given off by the shaft or heating pipe 31. In order to maintain the roll 27 in the desired longitudinal position on the shaft 31, that shaft is provided with collars 33 which abut the outer faces of the bearing members 32 and may be secured in desired position on the shaft 31 by some means such as set screws, not shown. Thus, after the machine is properly warmed up the roller 27 is heated by heat from the shaft 31 while still being freely rotatable thereon. Fly roll 14, being a heated roller, may likewise be stationary but preferably rotates and is of the same construction as the roll 27.

In Fig. 3 there is also shown the means by which roll 27 is mounted for vertical and horizontal adjustment. A sleeve 34 mounted on the shaft 31 is tiltably mounted by means of set screws or the like in a yoke 35. The yoke 35 is mounted on the upper end of a stub shaft 36 which latter extends into a housing 37 containing suitable means such as a rack and pinion for imparting vertical movement to it. A hand wheel 38, extending below the housing 37, would serve to actuate the means employed to give the shaft its vertical movement. For horizontal adjustment the housing 37 is furnished with a tongue 39 slidably receivable in a mating groove formed in the block 40. This block, as shown, is mounted on a suitable bracket 41 which may be an independent element or be an extension from the frame or base of the machine. Finally, a hand wheel 42 operates suitable mechanism for imparting horizontal movement to the housing 37 with respect to the block 40. The adjusting mechanism just described is shown only at one end of the roller 27 but it is to be understood that it is duplicated at the other end so that the roller 27 can be adjusted a reasonable distance both vertically and horizontally.

The adjustment of roller 27 contributes an important part in assuring the uniformity and excellence of the product.

This is due to the fact that it is placed close to the nip 28 between the rollers 10 and 11 and thus a slight movement of it has a rather substantial effect upon the direction which the sheet 7 takes in entering the nip. By the same token, the direction taken by the sheet 7 controls the pools of adhesive 29 and 30. This adhesive, as shown at 7a and 7b, travels on both sides of the sheet 7 and forms the pools 29 and 30. The pool 30 is shown as fairly small, which would result from the use of a stationary roller 27. When on the other hand the roller 27 rotates, it tends to build a larger pool 30 by throwing adhesive from its surface.

The maintenance of substantial pools 29 and 30 is important primarily because they thereby retain their heat and also because they prevent air from getting in between the sheets and forming bubbles therebetween. Also if a pool is there, the sheets can take what they want and the rest is squeezed out by the pressure of the nip. For some adhesives and for some materials being laminated, different sized pools need to be provided. This can be facilitated by the adjustment of roller 27, the provision for which has just been described. For laminating sheets of glassine paper with an adhesive made of thermoplastic material, we have found that a position of roller 27 with a horizontal tangent across its upper face slightly above a parallel plane passed through the nip 28 gives very satisfactory results.

As mentioned previously, we have found it advantageous to drive the roller 10 independently of the drive of the roller 11 so that the speed of its contacting surface can be regulated to synchronize with, or vary from, the speed of the surface of the roller 11. This is accomplished by means of the variable pitch sheaves shown in Figs. 5 and 6. These sheaves, designed for the reception of a V-belt, are indicated by the reference characters 43, 44 and 45. The belts engaged by them are shown at 46 and 47 while the two outer sheaves 43 and 45 are shown as being mounted on collars 48 and 49, which collars are in screw threaded engagement with the members 50 and 51. The collars 48 and 49 are designed to be adjusted toward and away from the center sheave 44 by being turned on the screw threads 50 and 51. In fact, they are shown in one extreme position in Fig. 5 and in the reverse in Fig. 6. Some means such as set screws, not shown, are employed for locking the collars 48 and 49 in adjusted position with respect to their screw mountings 50 and 51.

The whole of the construction just described is mounted on and keyed to a shaft 52 which serves either directly or through intermediaries for the driving of the roller 10. In other words, the shaft 52 may be the shaft of the driving motor, the shaft of roller 10 or, more preferably, it may be an intermediate shaft between the motor shaft and the shaft of roller 10. It is believed that the mechanics of altering the speed by this means would be readily appreciated by one skilled in the art. Where shaft 52 is an intermediate shaft, it may be positively driven and transmit its drive to the shaft of the roller 10 by means of the change speed sheaves 43, 44 and 45, or it may be driven through change speed sheaves, such as 43, 44 and 45, and pass that drive on positively. Thus, by spreading the sheaves 43 and 45 apart and allowing the belts 46 and 47 to ride in towards the shaft 52, the speed of that shaft can be increased and the reverse accomplished by moving the sheaves inward as shown in Fig. 5. In actual operation, as already mentioned, we have found that, with rollers of substantially the same size, better results are achieved by running the roller 10 at a slightly slower speed than the roller 11.

At the right in Fig. 1 there is shown the means for completing the operation performed by this machine. The completely laminated sheet 53 coming from the nip 28 is passed around a pair of rolls 54 and 55. These rolls may be warmed or cooled, with either steam or cold water as desired. Generally, however, we maintain the rolls at a temperature of approximately 110° F. in order to work out any inconsistencies in tension which might have been present in the paper up to this point. From the rollers 54 and 55 the paper passes over the fly roll 56 and is rolled up at 57 ready for the finishing room.

We believe that the method and operation of our invention are self-evident from the above description in which the features of importance in both the method and apparatus have been brought out at the appropriate places. Looking at the invention generally, the outstanding feature is the simplicity of the method and means by which we not only enable the lamination of three plies all at once, but at the same time provide a superior product.

Besides its effectiveness as a three-ply laminator, our apparatus lends itself admirably to conversion into a two-ply laminator, if such is desired. This may be accomplished in either one of two ways. The first and most desirable way is to eliminate the paper coming from roll 4 and hence make it unnecessary to use the dip roll 19 and the regulator roll 27. Thus, sheets 8 and 9 will be the sheets to be laminated. The machine so converted is shown diagrammatically in Figure 7.

The application of the adhesive is carried out by raising the pan 24, by suitable means, such as a hydraulic lift or hydraulic jacks, until the bottom of the roller 11 is emersed in the adhesive. The roller 11 should be immersed up to a line a little below the point at which the sheet 8 engages the roller so that no adhesive will get over on to the upper face of the sheet. The sheet 8 once it engages the roll 11 clings tightly to the surface of the same, so will only be wet by the adhesive on its exposed or lower face. The adhesive picked up by the lower face of the sheet 8 will be carried around on it, into the nip 28, and thus serve as the medium for securing the sheets 8 and 9 together. In other respects the elements of the machine which are used operate in substantially the same manner as described for three-ply lamination.

The other manner of using the machine for two-ply lamination, diagrammatically shown in Figure 8, calls for supplying paper 7 and 8 from rolls 4 and 5 respectively, and eliminating paper 9 from roll 6. In this form the dip roll 19 is kept well above the surface of the adhesive in the pan 24, while the sheet 7 is threaded under that roll, passes over the roll 27, and into the nip 28. Adhesive is applied by using the pan 24 to wet the under surface of the sheet 8 as just described for Figure 7. Obviously either one of these conversions from three-ply to two-ply lamination, or vice versa, can be made simply and with a minimum alteration of parts of the machine. Here again we believe we have simplified the production of laminated glassine paper in a manner not previously contemplated.

Having described our invention, what we claim as new and desire to cover by Letters Patent is:

1. A machine for laminating a plurality of sheets of material, which comprises a bath for maintaining adhesive in heated liquid form, a pair of pressure rolls, coming together at a nip, mounted above one part of said bath, means for heating the outside sheets to be laminated and engaging one of the same with the surface of one of said rolls and the other with the surface of the other of said rolls for a substantial distance in advance of said nip, guide means for immersing an intermediate sheet into another part of said bath to heat the sheet and coat the same on both sides with liquid adhesive, and additional heated guide means closely adjacent said nip to reheat said intermediate sheet and direct the same into said nip at substantially the same angle with respect to each of said outside sheets.

2. A machine for laminating a plurality of sheets of material which comprises a pair of pressure rolls coming together at a nip, a bath for maintaining adhesive in heated liquid form mounted below said rolls, said bath having a portion extending beyond the longitudinal and transverse confines of the lower of said rolls, means for heating the outside sheets to be laminated and engaging one of the same with the surface of one of said rolls, and the other with the surface of the other of said rolls for a substantial distance in advance of said nip, guide means for immersing an intermediate sheet into another portion of said bath to heat the sheet and coat the same on both sides with adhesive from said bath, and additional heated guide means closely adjacent said nip to reheat said intermediate sheet and direct the same into said nip at substantially the same angle with respect to each of said outside sheets.

3. A machine for laminating a plurality of sheets of material which comprises a pair of pressure rolls coming together at a nip, a bath mounted below said rolls for maintaining adhesive in heated liquid form, said bath having a portion extending beyond the horizontal confines of said rolls, means for heating the outside sheets to be laminated and engaging one of the same with the surface of one of said rolls, and the other with the surface of the other of said rolls, for a substantial distance in advance of said nip, guide means for immersing an intermediate sheet into another portion of said bath, to heat the sheet and coat the same on both sides with adhesive from said bath, and additional guide means closely adjacent said nip to direct said intermediate sheet into said nip at a pre-selected angle, with respect to each of said outside sheets, said additional guide means comprising a roller and an adjustable mounting therefor whereby the pre-selection of said angle may be effected when needed to adjust the manner in which said plurality of sheets is brought together.

4. A machine for laminating a plurality of sheets of material which comprises a pair of pressure rolls coming together at a nip, a bath mounted below said rolls for maintaining the adhesive in heated liquid form, said bath having a portion extending beyond the horizontal confines of said rolls, means for immersing the lower portion of the lower of said pressure rolls in the adhesive of said bath, and for separating the same therefrom, a dip roll operatively mounted, with respect to said bath, at another portion thereof, an adjustable mounting member for moving said dip roll from a position well below the normal liquid level within said bath to a position above said level, and heated guide means closely adjacent said nip on the side thereof towards said dip roll to reheat a sheet coming to said nip from said dip roll, and to guide the same into said nip at a predetermined angle with respect to the surfaces of said pressure rolls.

5. In a machine for laminating sheet-like material, a pair of pressure rolls for engaging the sheets to be laminated, a heated surface on one of said pressure rolls, a resilient surface on the other of said pressure rolls, means to introduce a plurality of sheets of material into the nip between said rolls for initial contact with intercalated adhesive at the moment pressure is applied to them, means to drive both of said pressure rolls, means to apply pressure to said pressure rolls to press together there between the sheets being laminated, variable speed driving means interposed between the drive for one of said rolls and the drive for the other so that variations in surface speeds of the surfaces of said rolls, such as by the flattening of the resilient surface on the other of said rolls where they contact said sheet material, may be eliminated by changing the speed of one roll with respect to the other.

6. The method of laminating sheet like material which comprises bringing three sheets of material to a common securing position at a nip from different directions, heating all of such sheets to bring them to said common securing position at a substantially uniform temperature, coating both sides of the intermediate of said three sheets with adhesive by immersing said intermediate of said three sheets in an adhesive bath adjacent said common securing position, leading said coated intermediate sheet up out of said bath, simultaneously reheating said intermediate sheet and the adhesive carried thereby and changing the direction of said intermediate sheet closely adjacent said common securing position to introduce said intermediate sheet into said common securing position at substantially equal angles with respect to said outside sheets, furnishing adhesive at said nip for the securing together of said sheets from the coatings on both sides of said intermediate sheet and pressing said sheets together, with their intercalated adhesive, at said common securing point.

7. The method of laminating three sheets of film like material which comprises furnishing a bath of adhesive material, heating the material in said bath and maintaining it at a temperature to keep it at a fluid state, introducing two sheets of said film like material to securing position over a portion of said bath from one direction, and introducing a third sheet of said film like material over a portion of said bath from another direction, immersing said third sheet of film like material into said bath to coat both sides of it with said adhesive material, leading said third sheet so coated upwardly out of said bath at a position adjacent said first two sheets, changing the direction of said third sheet to substantially the horizontal, while simultaneously heating the same and the adhesive carried thereby and, immediately thereafter, introducing said third sheet between said first two sheets to engage the same, with an intercalated layer of adhesive, at one and the same time, and at the time of said engagement pressing said three sheets together to secure them in laminated position.

8. The method of laminating three plies of film-like sheet material which comprises furnishing a bath of adhesive material, heating the material in said bath and maintaining it at a temperature to keep it in a fluid state, mounting a pair of pressure rolls over one portion of said bath, introducing a sheet of film-like material to be laminated around each of said pressure rolls, immersing another sheet of film-like material into another portion of said bath to coat both sides of said sheet with said adhesive, withdrawing said coated sheet out of said adhesve at a substantial angle with respect to the surface thereof, abruptly changing the direction of extension of said coated sheet closely adjacent the position where said two rolls approach each other with said first and second sheets thereon, and adjusting said change in the direction of extension of said third sheet to vary the amount of adhesive carried on either side thereof into the securing position between said rollers.

JOSEPH S. GLASING.
HAROLD D. MARCOTTE.

REFERENCES CITED

The following references are of record in the file of this patent:

UNITED STATES PATENTS

| Number | Name | Date |
|---|---|---|
| 601,317 | Fielden | Mar. 29, 1898 |
| 2,047,372 | Jalens | July 14, 1936 |
| 1,095,757 | Wentz | May 5, 1914 |
| 1,693,934 | Millspaugh | Dec. 4, 1928 |
| 695,239 | Severs | Mar. 11, 1902 |
| 809,375 | Jagenberg | Jan. 9, 1906 |
| 2,050,382 | Rowbotham et al. | Aug. 11, 1936 |
| 2,068,893 | Stuart | Jan. 26, 1937 |
| 318,910 | Jowitt | May 26, 1885 |
| 814,060 | Low | Mar. 6, 1906 |
| 2,207,073 | Shields | July 9, 1940 |
| 302,938 | Rankin | Aug. 5, 1884 |
| 444,821 | Feister | Jan. 20, 1891 |
| 1,902,713 | Lowe | Mar. 21, 1933 |
| 2,334,485 | Ettl | Nov. 16, 1943 |